Nov. 5, 1929.                A. B. TRIPP                1,734,926
                         PIEZO ELECTRIC DEVICE
                        Original Filed July 6, 1926

Inventor:
Augustus B. Tripp
by
His Attorney.

Patented Nov. 5, 1929

1,734,926

UNITED STATES PATENT OFFICE

AUGUSTUS B. TRIPP, OF CLIFTONDALE, MASSACHUSETTS, ASSIGNOR TO GENERAL ELECTRIC COMPANY, A CORPORATION OF NEW YORK

PIEZO-ELECTRIC DEVICE

Application filed July 6, 1926, Serial No. 120,760. Renewed January 7, 1929.

My invention relates to devices wherein a plurality of piezo electric elements having different frequency characteristics are utilized to select or predetermine the frequency at which an electric circuit is operated. The principal object of my invention is to provide an improved crystal controlled oscillator that is operable over a much greater range of frequencies than the crystal controlled oscillators heretofore provided. A further object is the provision of a device comprising a plurality of piezo electric elements mounted between a pair of electrodes in a mannner to cause the potential existing between the electrodes to be applied between the active faces of each of the elements.

It is known that a plurality of piezo electric elements, which have different frequency characteristics and are mounted between a pair of electrodes connected to an electric circuit, may be utilized to produce operation of the circuit at the frequency of any one of the elements. Piezo electric elements cut in the usual manner with their thickness dimensions in a direction substantially parallel with an electrical axis of the natural crystal, however, are not altogether satisfactory for use in a multi-frequency crystal controlled oscillator because the free vibration periods of the elements must be fairly close together in order to ensure proper operation of the oscillator. I have discovered that the frequency range of the crystal oscillator is greatly extended if the piezo electric elements are cut with their thickness dimensions substantially perpendicular to an electrical axis of the crystal and are so mounted between the electrodes that the full potential of the electrodes is applied between the active faces of each element.

My invention will be better understood from the following description when considered in connection with the accompanying drawing and its scope will be pointed out in the appended claims.

Figure 1:
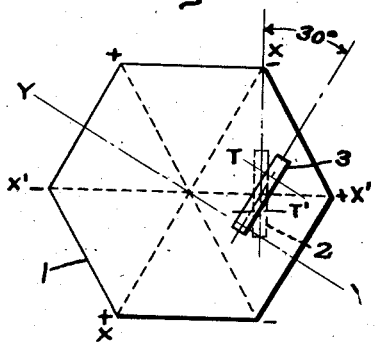
Figure 3:
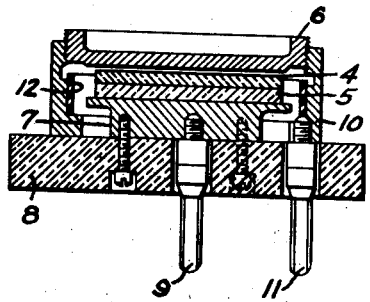
Figure 2:
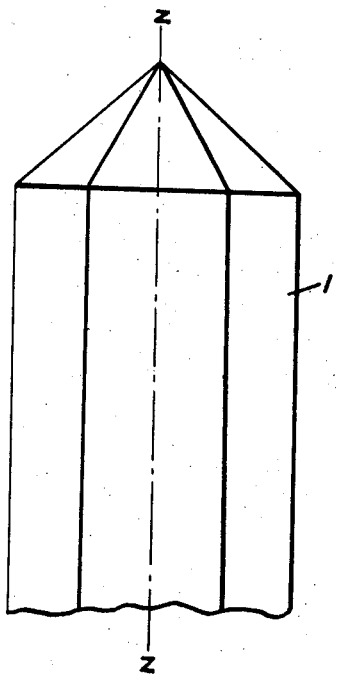
Figure 4:
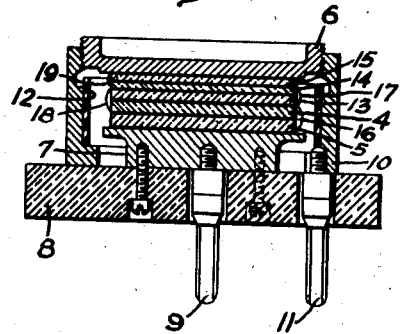

Referring to the drawing, Figs. 1 and 2 illustrate the manner in which the piezo electric element or slab is cut from the crystal; and Figs. 3 and 4 show different embodiments of my invention.

Figs. 1 and 2 illustrate a crystal 1 of quartz or other suitable piezo electric material. The electrical axes of this crystal are indicated by broken lines drawn between opposed corners of the crystal, plus and minus signs being placed at opposite ends of these lines for the purpose of indicating the relations that may be produced between the polarities of different parts of the crystal. The optical axis of the crystal is indicated by a line $z$—$z$, and one of the crystallization axes is indicated by a line $y$—$y$.

As previously indicated it is customary to cut a piezo electric element with its thickness dimension parallel with an electrical axis of the crystal. Such an element 2 is indicated by broken lines in Fig. 1. This figure also illustrates an element 3 which is cut from the crystal 1 as disclosed in a copending application of A. L. R. Ellis, Serial No. 115,369, filed June 11, 1926, and assigned to the same assignee as the present application. It will be observed that the element 3 has its thickness dimension T in a direction which is perpendicular to the electrical axis $x$—$x$ while the element 2 has its thickness dimension T' in a direction which is parallel with the electrical axis $x'$—$x'$.

Fig. 3 shows a multi-frequency crystal oscillator comprising piezo electric elements 4 and 5 which are similar to the element 3 of Fig. 1 and are made of different thicknesses in order to ensure operation of the oscillator at different selected frequencies. It will be observed that the elements 4 and 5 are mounted between electrodes 6 and 7; that the electrode 7 is fixed to an insulation base 8 and is connected to a terminal 9; and that the electrode 6 has its edge threaded into a collar 10 which is fixed to the insulation base 8 and functions both to support the adjustable electrode 6 and to electrically interconnect this electrode with a terminal 11. An insulation collar 12 is provided for protecting the edges of the elements 4 and 5 against injury due to their movement within the oscillator cell. It will be readily understood that the spacing between the electrodes 6 and 7 may be adjusted by rotation of the electrode 6.

Fig. 4 illustrates an embodiment of the invention which differs from that of Fig. 3 in that additional elements 13, 14 and 15 are interposed between the electrodes 6 and 7, and in that metal foil conductors indicated by the reference numerals 16 to 19 are utilized to interconnect the active faces of the elements in a manner to ensure that opposed faces of the elements are subjected to the potential applied to the electrodes 6 and 7 through the terminals 9 and 11. Thus it will be noted that the element 5 has its lower face in contact with the electrode 7 and its upper face connected to the electrode 6 through foil strips 18 and 19, that the element 4 has its upper face connected to the electrode 7 through foil strip 16 and its lower face connected to the foil strips 18 and 19; that the element 13 has its upper face connected to the electrode 6 through foil strip 19 and its lower surface connected to the electrode 7 through foil strip 16; that the element 14 has its lower face connected to the electrode 6 through the foil strip 19 and its upper face connected to the electrode 7 through foil strips 16 and 17; and that the element 15 has its upper face in contact with the electrode 6 and its lower face connected to the electrode 7 through foil strips 16 and 17.

With these connections, the active faces of the various elements are connected in parallel between the terminals 9 and 11 and the full voltage of these terminals is available to produce oscillations of the element selected to predetermine the frequency of the circuits connected to the terminals. It will of course be understood that the selection between the different elements is determined by adjustment of the circuit constants.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:—

1. The combination of a pair of electrodes, a plurality of piezo electric elements mounted face to face between said electrodes, and means for connecting said elements between said electrodes in parallel with one another.

2. The combination of a pair of electrodes, a plurality of piezo electric elements cut with their thickness dimensions in a direction perpendicular to an electrical axis of natural crystal and mounted face to face between said electrodes, and means for connecting said electrodes between said elements independently of one another.

3. The combination of a pair of electrodes, a plurality of piezo electric elements cut with their thickness dimensions in a direction perpendicular to an electrical axis of natural crystal and mounted face to face between said electrodes, and means for connecting said elements between said electrodes in parallel with one another.

4. The combination of a pair of electrodes, a plurality of piezo electric elements each having a different free vibration period and each having its thickness dimension along a line perpendicular to a face of the natural crystal, and means for connecting said elements between said electrodes in parallel with one another.

In witness whereof, I have hereunto set my hand this 1st day of July 1926.

AUGUSTUS B. TRIPP.